United States Patent [19]

Waugh

[11] 4,383,396
[45] May 17, 1983

[54] GRAPE STAKE

[76] Inventor: Charles J. Waugh, 15114 Oak Ranch Dr., Visalia, Calif. 93291

[21] Appl. No.: 298,876

[22] Filed: Sep. 2, 1981

[51] Int. Cl.³ .............................................. E04C 3/30
[52] U.S. Cl. ........................................ 52/40; 47/47; 52/7
[58] Field of Search ................... 52/40, 732, 733, 735, 52/165; 47/47; 404/10; 256/32, 34, 1, 21, 22, DIG. 5

[56] References Cited

U.S. PATENT DOCUMENTS 4,258,523  3/1981  Waugh .................................. 52/732
4,353,665 10/1982  Green ................................... 404/10

Primary Examiner—J. Karl Bell
Attorney, Agent, or Firm—Bruce L. Birchard

[57] ABSTRACT

By forming a metal stake with a "W"-shaped cross section where the flanges at the extremities of the main arms of the "W" are joined to the main arms not with an angular relationship rather with three connecting sections having gentle radii so that the edges of the flanges are depressed about 12° from a plane lying along the crowns formed by the connecting sections, those edges being knurled, a stake is provided which has superior torsional and flexural strength, has the ability to withstand the abuse of mechanical harvesting equipment without damaging that equipment and permits supporting, securely, at any desired height along the job, wires of any size and spacing without weakening such wires over time thru wear at the points of contact with the stake.

10 Claims, 2 Drawing Figures

GRAPE STAKE

BACKGROUND OF THE INVENTION

1. Field of the Invention.

This invention relates to supporting stakes or poles and particularly to such stakes or poles adapted for agricultural applications.

2. Prior Art.

Prior art stakes came in many configurations, such as with a channel cross-section and with vertically spaced hooks, notches or dimples to hold the wires in place. The channel cross-section did not represent an optimum strength for the weight or thickness of the steel used to make the stake. Further, if an attempt were made to minimize the gauge of the steel used the stakes or posts could not withstand the forces, particularly torsional forces, to which the stakes were subjected from time-to-time when, for example, agricultural machines, such as mechanized pickers, hit the wires supported by the stakes. Further, wire heights were dictated by the relatively widely-spaced hooks, notches or dimples on the stakes. Such hooks, notches and dimples removed metal and destroyed the integrity of the fabricated form thereby diminishing the torsional and flexural strength of the stakes. Furthermore, hooks and notches either break-off allowing the wire or wires to drop to the ground, with their fruit load, or eventually cut the trellis wire or wires with the same result.

Many of those problems were solved by my grape stake described in my U.S. Pat. No. 4,258,523 issued Mar. 31, 1981. However, in the field use of the patented stake certain problems arose which led me to make this invention. One of the uses for my stake is in vineyards. Because of the high cost of labor today, mechanical harvesters are now employed in the vineyards. Those mechanical harvesters operate on the principle of shaking the vine rather violently, causing the bunches of grapes to be separated from the vines and, thence, collected. Beater rods and shaker bars are utilized in the harvester and as the harvester moves down a row of grapes in the vineyard it strikes the poles supporting the vines. Two undesirable results occur.

First, the beater rods and shaker bars become damaged when they suddenly encounter the flat flanges on my patented post. This results in frequent and expensive replacement of those rods and bars.

On the other hand, the posts, when encountered by the beater rods and shaker arms of the mechanical harvester, suffer unusual stresses of both a torsional and flexural nature. Also, with conventional posts using notched edges or hooks, the supported wire is severly abraded and may be seriously weakened during the harvesting process.

It is an object of my invention, therefore, to overcome the general problems and disadvantages set forth hereinbefore.

It is a further object of my invention to provide an improved stake with great flexibility in wire positioning, great torsional and flexural strength and compatibility with mechanical harvesting apparatus.

SUMMARY OF THE INVENTION

Stated succinctly, by providing a stake with a "W"-shaped cross-section and with flanges at the extremities of the main arms of the "W" joined to those main arms thru connecting sections having gentle radii so that the edges of the flanges are depressed about 12' from a plane lying along the crowns formed by the connecting sections, those flange edges being knurled rather than notched, a stake is provided which has superior torsional and flexural strength and which is compatible with mechanical harvesting equipment.

BRIEF DESCRIPTION OF THE DRAWING

My invention, both as to its nature and operation, may best be understood by the description which follows, taken in conjunction with the drawing herein, in which.

DETAILED DESCRIPTION OF THE PREFERRED EMBODIMENT

Figure 1:
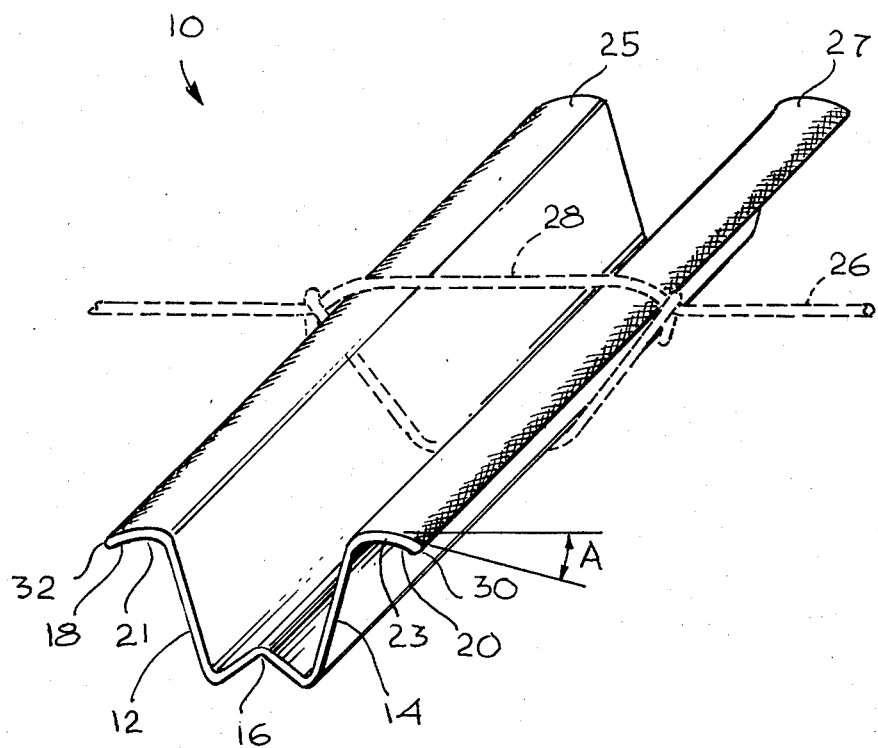
FIG. 1 is a perspective view of a grape stake according to my invention.
Figure 2:
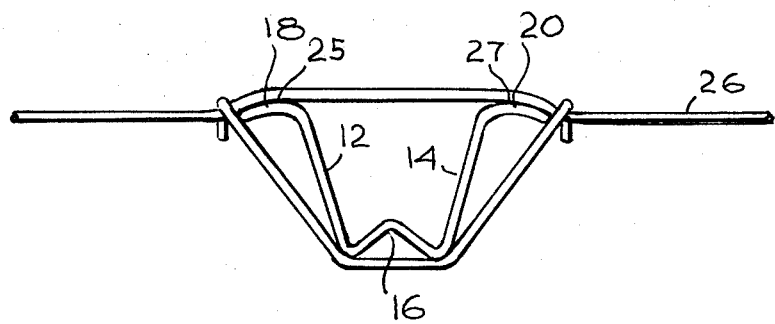
FIG. 2 is an end view of the grape stake of FIG. 1.

In FIGS. 1 and 2 stake 10 may be formed from 14 thru 18 gauge steel which may or may not be galvanized. It has a cross-section which is "W"-shaped with leg portions 12 and 14 joined by integral trough portion 16. Flange portions 18 and 20 are joined to leg portions 12 and 14 by connecting sections 21 and 23. Connecting sections 21, 23 have a gentle or relatively large radius forming crowns 25, 27. The resulting angle A (in the FIG. 1) which, the edge 30 of flange 20 as well as the edge 32 of flange 18, makes with the plane tangential to crowns 25, 27 is, for example, 10° to 15°, so that passing beater rods and shaker bars strike a rounded surface on the stake rather than an edge, thus reducing stress on both the stake and on the harvester. A greater angle than 15° results in an unacceptable loss in strength in the direction of a row, although strength in the direction transverse to a row is increased. A lesser angle than 10° results in greater strength transverse to a row but lesser strength in the direction of a row of interconnected stakes. Thus, an angle of 10° to 15° has been discovered by me to be optimum for overall performance. In that range I prefer 12°. The wire (such as a trellis wire) to be supported is shown, in phantom lines, as element 26. The clip or clamping wire 28, which holds wire 26 securely against stake 10 is also shown in phantom lines in FIG. 1 and in solid lines in FIG. 2.

Clip 28 engages the knurled edge portions 30, 32 and is prevented from slipping in vertical direction along the stake by the knurling, but is not cut by the knurling as it would be by notching because knurling merely displaces metal in stake 10. Knurling relies upon the malleability of a material to re-shape it. As the knurling tool passes over the opposed surfaces of stake 10 in the edge regions 30, 32 it forms the edge metal into contiguous hilly portions to increase the strength of the metal stakes. No metal is removed in the process. Even the galvanizing coating (if any) remains attached to the base metal. Thus stake strength is retained and rusting is prevented. Further, sharp edges are eliminated during the knurling process and the cutting of support clips 28 is avoided, as contrasted with the conventional notching process. Wire 26 may be positioned accurately as to elevation and will stay in position as a result of the knurling.

Connecting sections 21, 23, in addition to making stake 10 compatible with mechanical harvesting, as far as mutual impact of harvester and stake during harvesting, strengthens stake 10. The increased flexural strength which results eliminates the present need to determine the direction of the maximum wind force which can be anticipated at any site where the stakes are used. This feature is of great convenience to the field owner where the stake is to be installed.

While a particular embodiment has been shown and described it would be apparent to one skilled in the art that variations and modifications may be made without departing from the scope of my invention. It is the purpose of the attached claims to cover all such variations and modifications.

I claim:

1. A stake having a pair of oppositely sloped leg portions joined at one end of each thereof to a common trough portion, the opposite end of each of said leg portions terminating in a respective connecting portion, each such connecting portion having a cross section which is a sector of a circle and having a crown;

a flange section connected to each of said connecting portions and forming, with a plane tangential to each of said crowns, a depression angle in the range of 10° to 15°; and, each of said flange sections having an edge.

2. A stake according to claim 1 in which each of said flange sections is a tangential extension of its associated connecting portion.

3. Apparatus according to claim 1 in which each of said edges is knurled.

4. Apparatus according to claim 2 in which each of said edges is knurled.

5. Apparatus according to claim 1 in which the angle between a plane tangential to each of said crowns and the respective flange section is 12°.

6. Apparatus according to claim 1 in which each edge of said flange sections is knurled over its entire length.

7. Apparatus according to claim 1 in which said trough portion is V-shaped.

8. Apparatus according to claim 1 in which said leg portions, said trough portion, said connecting portions and said flange sections are integral.

9. Apparatus according to claim 8 in which said stake is formed from steel.

10. Apparatus according to claim 1, in which said knurled portion of each edge of said flange section is galvanized over its entire surface.

* * * * *